Jan. 11, 1927. 1,614,229
E. R. BURTNETT
INTERNAL COMBUSTION ENGINE
Filed April 23, 1925
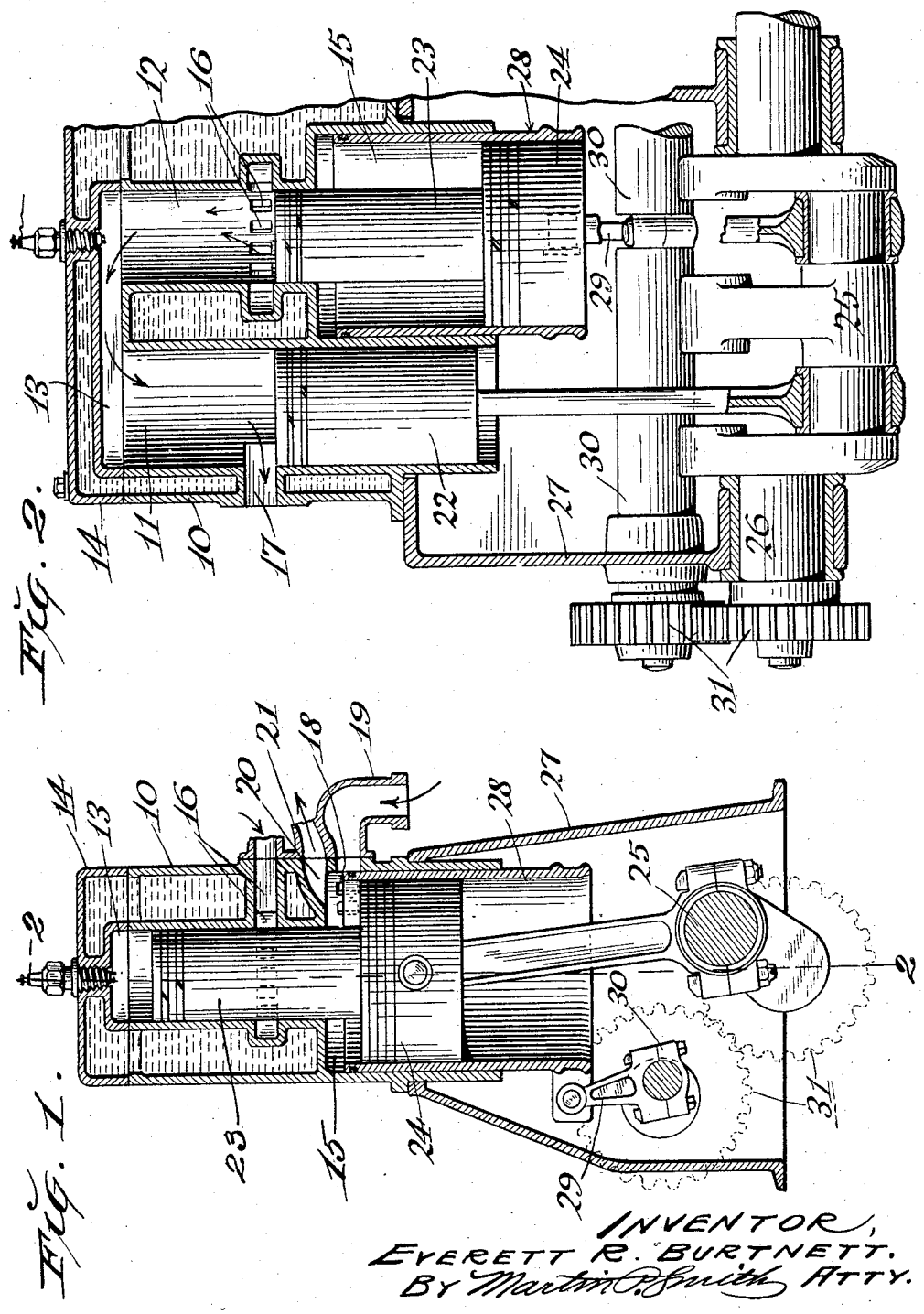
INVENTOR,
EVERETT R. BURTNETT.
By Martin P. Smith, ATTY.

Patented Jan. 11, 1927.

1,614,229

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed April 23, 1925. Serial No. 25,304.

My invention relates to internal combustion engines, and has for its principal object, the provision of relatively simple, efficient and positively operating sleeve valve means for controlling the admission of charge volumes to the charge pumping chamber of the engine, and which chamber is, in the type of engine to which my invention relates, the larger diameter portion of the piston that operates therein and said sleeve valve being operated in proper time relation to the two diameter piston with which it is associated.

With the foregoing and other objects in view, my invention consists in certain novel features of construction and arrangement of parts that will be hereinafter more fully described and claimed and illustrated in the accompanying drawings in which:

Fig. 1 is a transverse vertical section taken lengthwise through the center of one of the cylinders of an internal combustion engine and showing same equipped with the charge volume admission control sleeve valve contemplated by my invention.

Fig. 2 is a vertical section taken on the line 2—2 of Fig. 1.

Referring by numerals to the accompanying drawings which illustrate a practical embodiment of my invention, 10 designates a cylinder block, in which is formed a plurality of pairs of combustion chambers such as 11 and 12, the head or inner ends of the members of each pair being connected by a common clearance space such as 13 and the latter being formed in the underside of cylinder head block 14.

The diameter of combustion chamber 11 is uniform throughout its length, but the lower portion of the companion chamber 12, is increased in diameter to form a charge volume pumping chamber 15.

Combustion chamber 12 is provided with a series of charge volume inlet ports 16 and leading from chamber 11 is an exhaust port 17.

Formed through the cylinder wall that surrounds pumping chamber 15 and at the upper end thereof is a series of charge volume inlet ports 18 and leading thereto is a charge volume supply duct 19 that may be connected to a suitable source of gaseous fuel supply, for instance, a carburetor.

Formed through the cylinder wall and leading from the extreme upper end of pumping chamber 15 is a charge volume outlet port 20 and leading therefrom to the inlet ports of one of another pair of the combustion chambers, is a charge volume transfer duct 21.

Arranged for reciprocatory movement within chambers 11 and 12 are respectively, pistons 22 and 23, the latter being provided at its lower or outer end with a portion 24 of increased diameter that operates within chamber 15.

These pistons 22 and 23 are connected in the usual manner to the same throw 25 of a crank shaft 26 and the latter being mounted for operation in suitable bearings in a crank case 27.

Arranged for reciprocatory movement within chamber 15 and surrounding the larger diameter portion 24 of piston 23 is a sleeve 28 that performs the functions of a valve, inasmuch as it controls the inlet of charge volumes through inlet port 18.

The lower portion of this sleeve valve is connected by a short link or connecting rod 29, to the crank or eccentric of a shaft 30 that is driven at engine or crank shaft speed in any suitable manner, preferably by means of conjoined pinions 31 of equal size that are fixed respectively on crank shaft 26 and countershaft 30.

The crank or eccentric to which the sleeve valve is connected is disposed in relation to the crank throw to which the two diameter piston is connected, so that said sleeve valve operates slightly in advance of the piston and thus from the upper end of its stroke, the sleeve valve will have moved a short distance downward or a sufficient distance to slightly uncover and open inlet ports 18 before the piston starts downward on its induction or suction stroke.

In a similar manner sleeve valve 28 moving upward in advance of piston 23, 24, closes inlet ports 18 before said piston reaches top center and during the latter portion of the upward stroke of the piston, the charge volume inducted into chamber 15 is by the larger portion 24 of the piston pumped out through outlet port 20 and duct 21 to the inlet ports such as 16 of another one of the engines's combustion chambers such as 12.

Thus it will be seen that I have provided simple, efficient and positively acting sleeve valve means for controlling the admission of charge volume to the pumping chamber of a two stroke cycle internal combustion engine and which pumping chamber is the portion of larger diameter of the two diameter bore in one of the engine's cylinders.

It will be understood that minor changes in the size, form and construction of the various parts of my improved internal combustion engine may be made and substituted for those herein shown and described without departing from the spirit of the invention, the scope of which is set forth in the appended claims.

I claim as my invention:

1. In an internal combustion engine, a pair of cylinders, the bore of one of each cylinders is straight throughout its length, the bore of the other cylinder having two diameters, a common compression and combustion clearance chamber connecting the head ends of the two cylinders, the larger chamber of the two diameter cylinder being located at the crank end of said cylinder and functioning as a charge volume pumping chamber, said pumping chamber having an inlet port, a two diameter piston arranged for operation within said two diameter cylinder, a sleeve valve arranged for operation between the larger portion of the two diameter piston and the cylinder wall for controlling the passage of charge volume through said inlet port, means for reciprocating said sleeve valve at engine speed and said pumping chamber being provided with an outlet port.

2. In an internal combustion engine, a cylinder having a bore of two different diameters, the smaller diameter bore functioning as a combustion chamber and the larger diameter bore functioning as a charge volume pumping chamber, said pumping chamber having a charge volume inlet port and an outlet port, a two diameter piston arranged for operation within said two diameter bore cylinder, a sleeve valve arranged for reciprocatory movement within the pumping chamber for controlling the admission of charge volume through the inlet port into said pumping chamber and which sleeve valve encloses the larger portion of the two diameter piston that operates within said pumping chamber.

3. In an internal combustion engine, a cylinder having a bore of two different diameters, the smaller diameter bore functioning as a combustion chamber and the larger diameter bore functioning as a charge volume pumping chamber, said pumping chamber having a charge volume inlet port and an outlet port, a two diameter piston arranged for operation within said two diameter bore cylinder, a sleeve valve arranged for reciprocatory movement within the pumping chamber for controlling the admission of charge volumes through the inlet ports into said pumping chamber, which sleeve valve encloses the larger portion of the two diameter piston that operates within said pumping chamber and means for operating said sleeve at engine speed and in proper time relation to the reciprocation of said piston.

In testimony whereof I affix my signature,

EVERETT R. BURTNETT.